May 29, 1962 N. G. MORICI 3,036,817
BUMPER JACK
Filed July 6, 1959
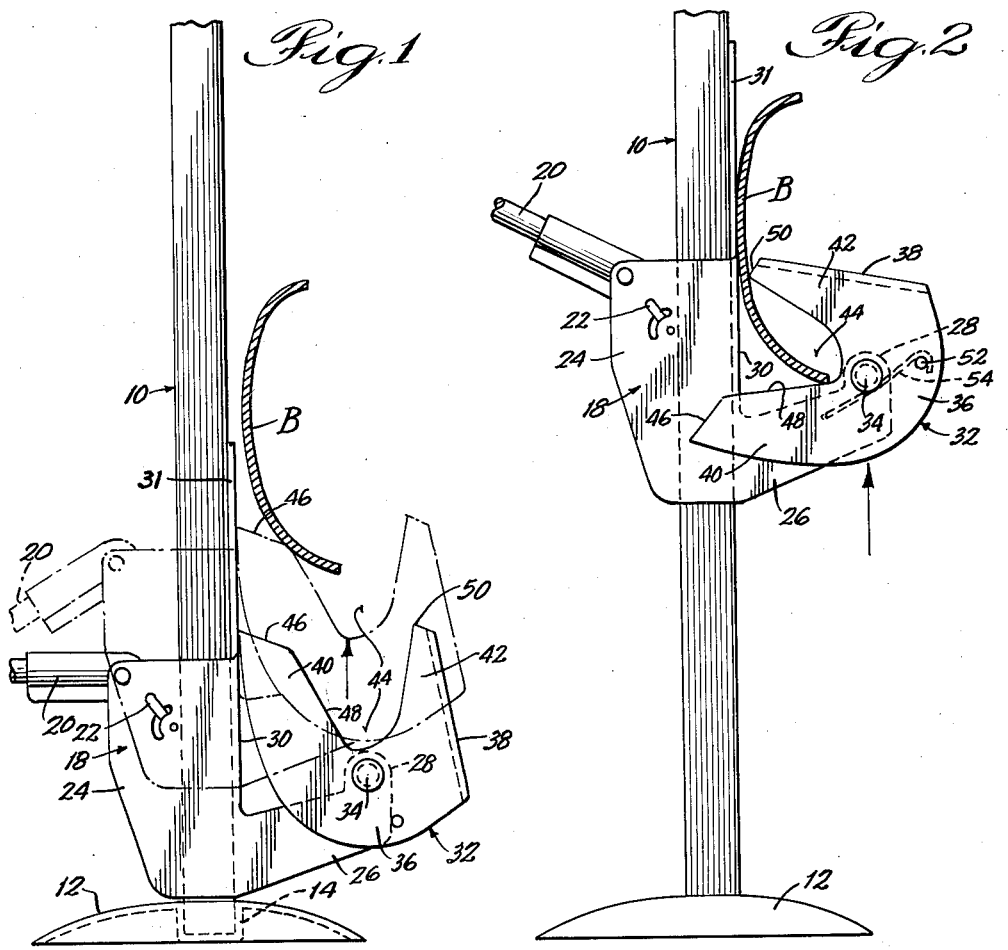
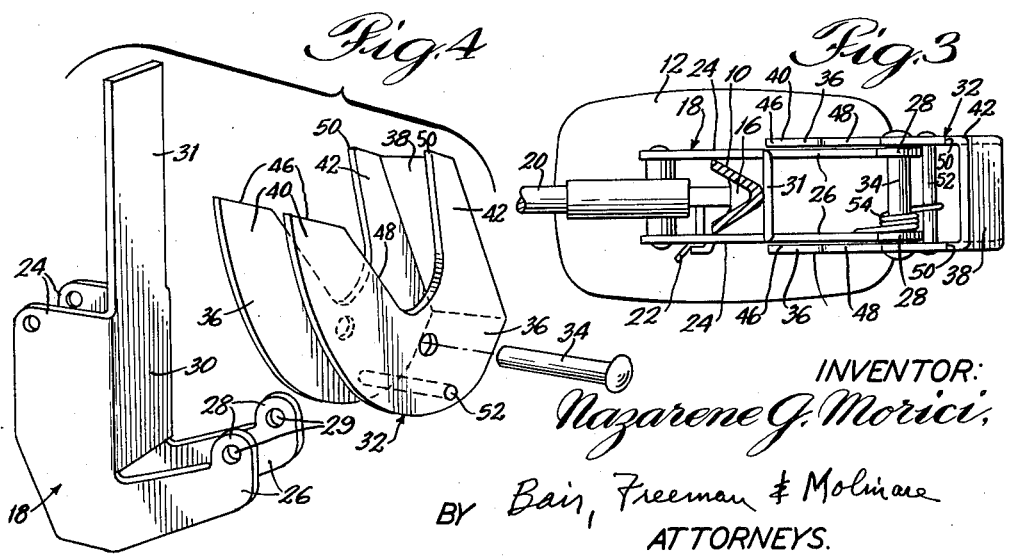
INVENTOR:
Nazarene G. Morici,
BY Bair, Freeman & Molinare
ATTORNEYS.

3,036,817
BUMPER JACK
Nazarene G. Morici, 3611 52nd Court, Cicero, Ill.
Filed July 6, 1959, Ser. No. 825,208
6 Claims. (Cl. 254—134)

This invention relates to bumper jacks for automobiles and the like and more particularly relates to a bumper gripping means for insuring and maintaining connection between the bumper jack and the bumper of the automobile.

Bumper jacks are, of course, notoriously old. The simplest form of bumper jack utilizes a single support post having a carriage movable therealong with a hook on the carriage for engaging the underside of an automobile's bumper. There exist many deficiencies with such simple existing jacks. Principally, because of instability of the single support post, jacked-up cars frequently fall from the jack inflicting property damage or bodily damage, or both. Because of the distrust with which single support post jacks are viewed by the general public, more expensive tripod and bipod jacks have been increasingly used. But these multiple legged jacks also have deficiencies in that not only are they more expensive, but as the hook supporting carriage moves upwardly along one leg of the jack, it also moves away from the automobile's bumper.

Another deficiency exists in that jack manufacturers have taken to manufacturing specially shaped hooks for bumper jacks for use with particular automobiles. Thus, while a hook may work properly when used with the automobile for which its use was intended, the hook may completely fail to cooperate properly with a bumper on another automobile.

Thus, the object of this invention is to provide an improved single post bumper jack which operates in a manner superior to existing single post bumper jacks in that it grips the automobile's bumper in such a manner as to more fully insure the connection between the jack and the bumper of the automobile.

Another object of this invention is to provide an improved bumper-engaging hook means for an automobile which hook means are designed to cooperate with a wide variety of bumpers of different shape and size.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 1 is a side elevation view of a single post bumper jack constructed in accordance with this invention and shows in full lines the carriage and bumper-engaging hook in lowered position, and shows in dot-dash lines the carriage and hook in an elevated position when the hook first engages the bumper of an automobile.

FIGURE 2 is similar to FIGURE 1 but shows the carriage and hook in elevated position with the hook in full operative engagement with the bumper of an automobile when the bumper has been jacked up.

FIGURE 3 is a top plan view of the bumper jack shown in FIGURE 1; and

FIGURE 4 is an exploded view showing the novel carriage and hook means of the bumper.

Referring now to the drawings, there is shown in FIGURE 1 a bumper jack which includes an upright post generally indicated at 10, and a stamped sheet metal base, or stand, 12. The stand 12 is formed with a depressed portion 14 serving as a socket for receiving the lower end of the post 10. The jack illustrated is of the type generally known as a ratchet-lever jack, wherein the post 10 is provided with a plurality of vertically spaced teeth 16, and there is provided a carriage 18 which is adapted to move stepwise along the length of the post 10. The carriage is provided with a lever means 20 having parts which coact with the teeth 16 on the post 10, to move the carriage 18 in stepwise manner upwardly along the post 10. There is provided movable control 22 which, when swung to one position, permits movement of the carriage 18 upwardly along the post 10, while when swung to another position permits movement of the carriage 18 downwardly along the post 10, in response to pumping action of the lever 20. This general type of jack is well known in the art, and the general combination thus disclosed forms no part of this invention.

Now, the specific carriage 18 which is here provided is particularly formed and shaped to assist in the achieving of the results which are hereinafter disclosed. Accordingly, the carriage 18 is shown as provided with a pair of spaced side panels 24, having a pair of arms 26 extending therefrom, and each of the arms 26 is provided with an upwardly extending knuckle 28 appropriately apertured at 29 to receive a pivot pin. The sides 24 of carriage 18 are joined by a web portion 30, and the web portion 30 extends upwardly a considerable distance relative to the sides 24 and thereby defines an extension 31 which serves as an abutment means against which the bumper B of a car is to be pressed. It will be seen, by reference to the figures, that the abutment means 31, when the jack is operative, is interposed between an automobile's bumper B and the post 10 of the jack.

There is provided a hook means generally indicated at 32, which is pivotally mounted on a pivot bolt 34 carried in apertures 29. The hook means 32 is formed of sheet metal that has been shaped and bent to define a pair of spaced, parallel, side members, generally indicated at 36, which are joined together, at one edge, by a web 38. Each side panel, or member 36, when viewed in side elevation, defines a generally U-shaped member. It will be seen that a first arm 40 of the U, when in the position of FIGURE 1, is located between the pivot bolt 34 and the post 10, and the second arm 42 of the U is spaced further from post 10, or outwardly of pivot bolt 34.

The spaced arms 40 and 42 define a recess 44 therebetween. The first arm 40 is shaped so that its uppermost inner edge 46 slopes inwardly and downwardly toward recess 44, and then merges with a curved inner edge 48 which bounds the recess 44. The curved inner edge 48 terminates at the terminus 50 defined at the uppermost point of second arm 42.

The hook means 32 carries a stop member, in the form of pin 52, which extends between the side members 36 and which is adapted to engage the outer edges of the arms 26, as best seen in FIGURE 1, so as to limit clockwise pivotal movement, as viewed in FIGURE 1, of the hook means 32 relative to the axis of the pivot bolt 34. A spring 54 is provided, which coils around pivot bolt 34 and which anchors at one end against stop 52, and which operates to normally bias the hook means 32 to the position shown in full lines in FIGURE 1.

The sides 36 of the hook means 32 are located outwardly of the arms 26 and of the sides 24 of the carriage 18, and the sides of the carriage 24 are located outwardly of the post 10. In this way, when the hook means 32 pivots from the position of FIGURE 1 to the position of FIGURE 2, there is no interference by the jack structure or carriage structure with the movement of the first arms 40. Stated in another way, the arms 40 of hook means 32 are laterally offset from a plane through the post 10 which is perpendicular to pin 34.

In the operation of the device, the jack post 10 is positioned closely adjacent the bumper B of an automobile, with the hook means 32 in the position shown in full lines in FIGURE 1, located below bumper B. By actuating the lever 20, the carriage 18 is caused to rise along post 10 until the first arm 40 engages a portion of the bumper B, as seen in the dot-dash lines of FIGURE 1. Further upward movement of the carriage 18 along post 10 causes pivoting of the hook means 32 to a position, as shown in full lines in FIGURE 2, wherein the lowermost edge of the bumper B engages the inner edge 48 of hook means 32 along the first arm 40, and wherein the second arm 42 of the hook means 32 has swung inwardly so that the terminus 50 on the second arm 42 engages the inner side of the bumper B, while the outer side of the bumper B is pushed against the abutment means 31 which is the upwardly extending portion of the carriage 18.

This pivotal movement of the upwardly-opening U-shaped hook means 32 to a laterally opening position of FIGURE 2 operates to clamp the bumper B between the abutment 31 and the second arm 42 of the hook means 32, and restricts lateral movement between the jack and the automobile, and thereby avoids the possibility of the automobile slipping off the hook means 32 of the jack.

It will be seen that the shape of the hook means 32 is such that the first arm 40 extends above arm means 26 as in FIGURE 2 and the lower edge of the bumper B engages the inner edge 48 of the hook means 32 at a point spaced above the uppermost extent of arms 26, so that the hook means 32 receives the load and transmits the load to the carriage. The shape and size of hook 32 is such that it will cooperate with most bumpers used today, thereby increasing the usefulness of a jack of the type disclosed herein. Although in the preferred form the carriage 18 and hook 32 here disclosed are for use with a single post bumper jack, it will be understood that a similar carriage and hook may be used in combination with the lifting post of a bipod or tripod jack. Furthermore, while the jack lifting means are here shown as including a pivotable lever means 20 for a ratchet-lever jack, it will be understood that other lifting means such as an elongated screw, or even hydraulic lifting means, may be utilized.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A bumper jack for automobiles comprising, in combination, an elongated upright support, a carriage movable in opposite directions longitudinally along said support between the ends of the support, arm means extending from said carriage laterally of said support, bumper-engaging means pivotally mounted on the extended arm means spaced laterally of said support, abutment means carried by said carriage and extending upwardly therefrom and disposed laterally of said support to be located between said upright support and said bumper-engaging means, and the bumper-engaging means being pivotable, upon engagement with an automobile bumper, to a position where the bumper-engaging means engages the inside of a bumper while the outside of said bumper simultaneously engages said abutment means.

2. A bumper jack for automobiles comprising, in combination, an elongated upright support, a carriage movable in opposite directions longitudinally along said support between the ends of the support, arm means extending from said carriage laterally of said support, and a generally U-shaped bumper-engaging means pivotally mounted on the arm means at a point spaced laterally of said support and arranged so that the U normally opens generally upwardly with a first arm of the U located between the pivot and the upright support and with the second arm of the U located outwardly of the pivot, said U-shaped means being pivotable, upon operative engagement with an automobile bumper, to a position where the U-shaped means opens generally laterally toward the upright support, with said first arm engaging the lower edge of a bumper, and a portion of the second arm engaging the inner side of the bumper.

3. A bumper jack for automobiles comprising, in combination, an elongated upright support, a carriage movable in opposite directions longitudinally along said support between the ends of the support, arm means extending from said carriage laterally of said support, a generally U-shaped bumper-engaging means pivotally mounted on the arm means at a point spaced laterally of said support and arranged so that the U normally opens generally upwardly with a first arm of the U located between the pivot and the upright support and with the second arm of the U located outwardly of the pivot, said U-shaped means being pivotable, upon operative engagement with an automobile bumper, to a position where the U-shaped means opens generally laterally toward the upright support, with said first arm engaging the lower edge of a bumper, and a portion of the second arm engaging the inner side of the bumper, and said U-shaped means, when in a bumper-gripping position, being arranged relative to said arm means so that said first arm extends above said arm means to engage the lower edge of the bumper.

4. A bumper jack for automobiles comprising, in combination, an elongated upright support, a carriage movable in opposite directions longitudinally along said support between the ends of the support, arm means extending from said carriage laterally of said support, a generally U-shaped bumper-engaging means pivotally mounted on the arm means at a point spaced laterally of said support and arranged so that the U normally opens generally upwardly with a first arm of the U located between the pivot and the upright support and with the second arm of the U located outwardly of the pivot, said U-shaped means being pivotable, upon operative engagement wth an automobile bumper, to a position where the U-shaped means opens generally laterally toward the upright support, with said first arm engaging the lower edge of a bumper, and with a portion of the second arm engaging the inner side of the bumper, spring means biasing the bumper-engaging means toward its normal position, and stop means between said bumper-engaging means and said arm means for limiting pivoting under the bias of said spring means.

5. A bumper jack for automobiles comprising, in combination, an elongated upright support, a carriage movable in opposite directions longitudinally along said support between the ends of the support, arm means extending from said carriage laterally of said support, abutment means carried by said carriage and extending upwardly therefrom, and a generally U-shaped bumper-engaging means pivotally mounted on the arm means at a point spaced laterally of said support and arranged so that the U normally opens generally upwardly with a first arm of the U located between the pivot and the upright support and with the second arm of the U located outwardly of the pivot, said U-shaped means being pivotable, upon operative engagement with an automobile bumper, to a position where the U-shaped means opens generally laterally toward the upright support, with said first arm engaging the lower edge of a bumper, and with a portion of the second arm engaging the inner side of the bumper and with the abutment means simultaneously engaging the outer side of the bumper.

6. A bumper jack for automobiles comprising, in combination, an elongated upright support, a carriage movable in opposite directions longitudinally along said support between the ends of the support, arm means extending from said carriage laterally of said support, and a bumper-engaging means pivotally mounted on the extended arm means and arranged so that the bumper-engaging means is normally at a first attitude, said bumper-engaging means being pivotable, upon operative engagement with an automobile bumper, away from said first attitude to a second attitude where one portion of said bumper-engaging means engages the lower edge of the bumper and with a second portion of the bumper-engaging means engaging the inner side of the bumper, so that the bumper is positioned between said second portion of the bumper-engaging means and said upright support.

References Cited in the file of this patent

UNITED STATES PATENTS

| | | |
|---|---|---|
| 1,541,306 | Young | June 9, 1925 |
| 2,516,483 | Parker | July 25, 1950 |
| 2,743,903 | Lucker | May 1, 1956 |